United States Patent
Gao (10) Patent No.: US 10,915,229 B1
(45) Date of Patent: Feb. 9, 2021

(54) MERGING ENTITIES MAINTAINED BY AN ONLINE SYSTEM SUBJECT TO SELECTION OF INTERACTIONS WITH AN ENTITY BEING MERGED BY USERS WHO PERFORMED THE INTERACTIONS WITH THE ENTITY BEING MERGED

(71) Applicant: Facebook, Inc., Menlo Park, CA (US)

(72) Inventor: Zhonghu Gao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 139 days.

(21) Appl. No.: 16/373,143

(22) Filed: Apr. 2, 2019

(51) Int. Cl.
*G06F 3/0481* (2013.01)
*G06F 3/0483* (2013.01)
*G06F 3/0484* (2013.01)
*G06F 16/958* (2019.01)

(52) U.S. Cl.
CPC ........ *G06F 3/0483* (2013.01); *G06F 3/04847* (2013.01); *G06F 16/986* (2019.01)

(58) Field of Classification Search
CPC .... G06F 3/0481; G06F 3/0483; G06F 16/986; G06F 3/04847; G06F 16/954
IPC ...................................................... G06F 16/986
See application file for complete search history.

(56) References Cited

U.S. PATENT DOCUMENTS

2009/0167553 A1* 7/2009 Hong ..................... G06Q 10/02
340/4.61
2010/0192054 A1* 7/2010 Nauerz ................. G06F 16/954
715/234

* cited by examiner

*Primary Examiner* — Haoshian Shih
(74) *Attorney, Agent, or Firm* — Fenwick & West LLP (57) ABSTRACT

An online system maintains user interactions with different entities, such as pages, maintained by the online system. The online system also allows an administrator of multiple entities to merge two or more of the entities. When merging entities, the online system allows the administrator to select specific interactions by the administrator with the entities to be merged that are subsequently associated with the entity resulting from the merge. The online system also presents an interface to other users who have interacted with the entities to be merged that allows the users to select individual interactions with the entities to be merged to be associated with the entity resulting from the merge. The interface allowing the user to select the individual interactions may be accessed via a notification sent to the user by the online system.

21 Claims, 4 Drawing Sheets

MERGING ENTITIES MAINTAINED BY AN ONLINE SYSTEM SUBJECT TO SELECTION OF INTERACTIONS WITH AN ENTITY BEING MERGED BY USERS WHO PERFORMED THE INTERACTIONS WITH THE ENTITY BEING MERGED

FIELD OF THE DISCLOSURE

This disclosure relates generally to maintaining information at an online system identifying user interactions with objects maintained by the online system, and more specifically to regulating information prior user interactions with different objects when merging the different objects.

BACKGROUND

Online systems maintain various objects that are presented to users of the online system to provide information or to provide other content to the users of the online system. For example, an online system maintains pages of content corresponding to different businesses or organizations. Users of the online system access a page of content corresponding to a business or an organization to access content about the business or the organization. Additionally, users may interact with objects maintained by the online system, and the online system stores those interactions in association with the object. For example, a user provides content items to the online system for presentation to other users via an object, establishes a connection with the object to receive content to the online system for presentation via the object, or establishes a message thread to exchange messages with another user via the object. Maintaining interactions between users and an object maintained by the online system allows a user associated with a maintained object to gauge user interest in the object to improve subsequent presentation of content by the object. An administrator who provides content to different objects maintained by the online system may seek to merge objects over time. For example, the online system maintains pages for different businesses, and the administrator of pages for different pages merges different pages for different businesses when one of the businesses closes.

SUMMARY

An online system maintains information for a source object and a destination object that are each associated with a common administrator user. For example, the source object is a source page maintained by the online system and the destination page is a destination page maintained by the online system. In a specific example, the source object is a page for a business and the destination object is a page for a different business. Additionally, the online system maintains interactions by users with the source object and with the destination object. For example, the online system maintains connections between interactions with the source object and with users who performed the interactions, with a connection between the source object and a user identifying an interaction the user performed with the source object. Similar connections between the destination object and with users who performed interactions with the destination objects are also maintained by the online system. Example interactions performed by a user with an object include: providing a content item for presentation via the object, providing a comment on a content item presented via the object, exchanging messages with the administrator user via the object, establishing a connection with the object, and providing a reaction for the object (e.g., indicating a preference for the source page).

The online system receives a request from the administrator user associated with the source object and with the destination object to merge the source object and the destination object. For example, the request includes an instruction to merge the source object into the destination object. In a specific example, the online system receives a request to merge a page maintained by the online system for a specific business with a page maintained by the online system for a different business. In response to receiving the request from the administrator user, the online system retrieves previous interactions by various users with the source object maintained by the online system and previous interactions by various users with the destination object by various users, and identifies the users who previously interacted with the source object or with the destination object.

For an identified user who previously interacted with the source object or with the destination object, the online system transmits a notification that the source object and the destination object are merging to a client device associated with the identified user. The notification includes information identifying the source page and identifying the destination page, as well as text or images indicating that the source object and the destination object are merging. For example, the notification includes a name or a title of a source page of content and a name or a title of a destination page of content, as well as text stating that the source page is merging with the destination page.

If the online system received requests to merge different combinations of source objects and destination objects, the online system ranks different pairs of source objects and destination objects requested to be merged based on likelihoods of the identified user selecting interactions with an object of a pair of objects to requested to be merged for association with an object resulting from the merge. For example, the online system received a request to merge page A and page B, as well as a request to merge page C and page D from one or more administrator users associated with page A, page B, page C, and page D. When generating a notification identifying the received requests to merge pages for a user, the online system determines a likelihood of the user selecting interactions with page A or with page B for association with a page resulting from merging page A and page B and determines a likelihood of the user selecting interactions with page C or with page D for association with the resulting page from merging page C and page D. The notification transmitted to the identified user identifies the request to merge page A and page B and the request to merge page C and page D in an order based on the determined likelihoods (e.g., requests having higher determined likelihoods are presented in higher positions within the notification).

The online system may use any suitable information to determine likelihoods of a user selecting interactions with objects requested to be merged with each other. For example, the online system determines a user has a higher likelihood of selecting interactions with objects associated with physical locations closer to a physical location maintained by the online system for the identified user to be associated with an object resulting from merging different objects than of selecting interactions with objects associated with physical locations closer to a physical location maintained by the online system for the identified user. In the preceding example, the online system generates the notification so pairs of objects to be merged that include objects associated with physical locations closer to the physical location of the user are presented in higher positions of a list of pairs of objects requested to be merged. In another example, the online system determines likelihoods of the user selecting interactions with one or more objects requested to be merged based on timing or frequency of interactions by the user with objects. The online system may determine a higher likelihood of the identified user selecting interactions with objects with which the user more frequently interacted or more recently interacted for subsequent association with an object resulting from merging a pair of objects. For example, the online system determines the identified user is more likely to select interactions with a specific object with which the identified user more frequently interacts or has most recently interacted for association with an object resulting from merging the specific object and another object. In the preceding example, the online system generates the notification so pairs of objects to be merged that include objects with which the identified user more frequently interacted or more recently interacted are presented in higher positions of a list of pairs of objects requested to be merged.

The online system generates an interface identifying the identified user's prior interactions with the source object or with the destination object. In some embodiments, the online system generates the interface in response to receiving a selection of the notification from the identified user. Alternatively, the online system generates the interface after identifying the user previously interacted with the source object or with the destination object and stores the interface in association with the user. To generate the interface, the online system retrieves stored interactions that are associated with the identifier of the source object and that are associated with an identifier of the identified user. Similarly, the online system retrieves stored interactions that are associated with the identifier of the destination object and that are associated with the identifier of the identified user.

In various embodiments, the online system groups previously performed interactions by the user with the source object (or with the destination object) by type of interaction, with different display regions of the interface displaying different groups of objects; hence, different display regions of the interface may display different types of interactions with the source object or with the destination object. Example types of interactions include providing content for presentation by the source object (or by the destination object), establishing a connection with the source object (or with the destination object), and creating a message thread with the administrator user via the source object (or via the destination object). In the preceding example, the online system generates the interface with three distinct regions that each correspond to a specific type of interaction with the source object or with the destination object. The generated interface visually differentiates between different display regions in various embodiments.

Additionally, the interface includes an entry for each previously identified interaction with the source object or with the destination object and a selection option corresponding to each entry. For example, an entry includes a description of an interaction and a time when the interaction was performed and a selection option is presented proximate to the entry. The identified user selects a selection option presented proximate to an entry to select an interaction described by the entry to specify an interaction corresponding to the entry for association with the object resulting from merging of the source object with the destination object. For example, the selection option is a check box that the identified user checks to select an interaction for association with the object resulting from merging of the source object and the destination object. Hence, the interface allows the identified to select individual interactions with the source object or with the destination object that are subsequently associated with the object resulting from merging the source object and the destination object. This provides the identified user with greater control over interactions that the identified user previously performed with the source object or with the destination object that are subsequently associated with the object resulting from merging the source object and the destination object, which provides the identified user with greater privacy regarding prior interactions with the source object or with the destination object that are accessible by users who subsequently access the object resulting from merging the source object and the destination object.

After receiving a selection identifying interactions with the source object or with the destination object from the identified user, the online system stores associations between the object resulting from merging the source object and the destination object (e.g., the destination object) and each of the selected interactions by the identified user with the source object or with the destination object identified by the received selection. Additionally, the online system deletes associations between interactions by the identified user with the source object or with the destination object that are not identified by the received selection. Hence, identifying individual interactions with the source object or with the destination object via the interface allows the identified user to control which prior interactions the online system subsequently associates with the object resulting from merging the source object and the destination object destination page after being merged with the source page, providing the user with increased control over subsequent access to the user's prior interactions after merging the source object with the destination object.

The online system similarly allows the administrator user to identify individual interactions with the source object or with the destination object for association with the object resulting from merging the source object with the destination object. In various embodiments, the online system identifies interactions by the administrator user with the source object or with the destination object from stored interaction associated with the source object and with the destination object, as further described above. In various embodiments, the online system transmits an additional interface, as further descried above, identifying individual interactions by the administrator user with the source object or with the destination object to a client device associated with the administrator user. The administrator user selects individual interactions for association with the object resulting from merging the source object and the destination object via the additional interface and transmits an administrator selection including interactions by the administrator user with the source object or with the destination object for association with the object resulting from merging the source object and the destination object. Subsequently, the online system stores associations between the interactions identified by the administrator selection with the object resulting from merging the source object and the destination object. Additionally, the online system deletes associations between interactions by the administrator user with the source object that are not identified by the administrator selection received from the administrator user and similarly deletes associations between interactions by the administrator user with the destination object that are not identified by the administrator selection. Hence, the online system also allows the administrator user to selectively identify individual prior interactions with the source object or with the destination object that are stored in association with the object resulting from merging the source object and the destination object (e.g., the destination object), increasing the administrator user's control over subsequent access to the administrator user's prior interactions after merging the source object with the destination object.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online system maintains various objects, such as pages, that include content for presentation to online system users, allowing a user to include content on an object to present the content to other users via the page. Users of the online system may also interact with the object, and the online system stores interactions by the users with the objects in association with the objects with which the users interacted. An object maintained by the online system is associated with an administrator user, who is a user authorized to modify content or other characteristics of the object, such as a page. An administrator user associated with different objects may request the online system merge the different objects in some circumstances. For example, the administrator user is associated with different objects that present content for different businesses, and when one of the businesses closes, the administrator user requests to merge content from the object for the business that is closing with content from the object for the business that remains open.

When merging different objects, conventional online systems associate prior user interactions with each of the objects being merged with the object resulting from merging the objects. For example, if a page for a business is merged into a page for another business, conventional online systems associate each prior interaction by users with the page for the business with the page for the other business. However, additional or alternative users may be able to identify interactions by a user with the object resulting from merging different objects than were able to view interactions by the user with an individual object prior to merging. Hence, simply migrating a user's actions with an object to be merged with another object to the object resulting from the merge decreases the user's control over what other users can identify the user's interactions with an object. For example, additional administrators are associated with an object resulting from merging different individual objects than are associated with one of the individual object being merged; hence, migrating all interactions of a user with one of the individual objects to the object resulting from merging different individual objects allows additional administrators to review a user's prior interaction with one of the individual objects prior to merging. Therefore, conventional online systems provide users with limited ability to regulate how users' interactions with objects maintained by the conventional online systems are treated when different individual objects with which the users previously interacted are merged or otherwise combined.

As further described below in conjunction with FIGS. 2-5, the online system described herein allows users who have previously interacted with an object that has been requested to be merged with an additional object to identify specific prior interactions with the object to associate with the resulting object from merging the object and the additional object. After receiving a request to merge an object and an additional object from an administrator user associated with the object and with the additional object, the online system described herein identifies users who interacted with the object or with the additional object and identifies prior interactions by the user with the object or with the additional object. As further described below in conjunction with FIGS. 4 and 5, the online system transmits a notification to a user who previously interacted with the object or with the additional object. The notification identifies the object and the additional object and specifies that the object and the additional object have been requested to be merged.

After receiving a selection of the notification, the online system transmits an interface to the user. The interface identifies each prior interaction by the user with the object or with the additional object and includes a selection option associated with each prior interaction. Through the user interface, the user selects individual prior interactions to be associated with the result of merging the object and the additional object. For example, the user selects a selection option associated with individual prior interactions to be associated with the result of merging the object and the additional object. The online system receives the user's selection of specific prior interactions with the object or with the additional object, and subsequently associates the selected prior interactions by the user with the object or with the additional object with the result of merging the object and the additional object; however, the online system does not store associations between prior interactions with the object or with the additional object that the user did not select with the result of merging the object and the additional object. Hence, the interface allows the identified to select individual interactions with the source object or with the destination object that are subsequently associated with the object resulting from merging the source object and the destination object. This provides a user who previously interacted with the object or with the additional object with greater control over interactions that the user previously performed with the object or with the additional object that are subsequently associated with the object resulting from merging the object and the additional object. This increased control over what prior interactions are associated with the object resulting from merging the object and the additional object provide a user with greater privacy regarding prior interactions with the object or with the additional object that are accessible by users who subsequently access the object resulting from merging the object and the additional object.

System Architecture

Figure 1:
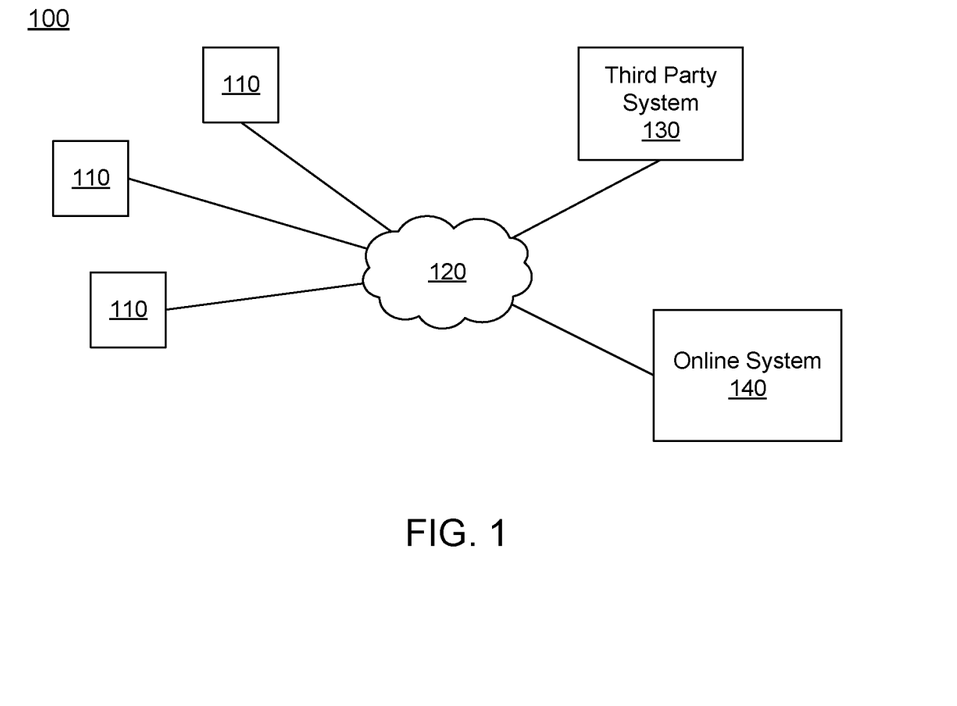
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
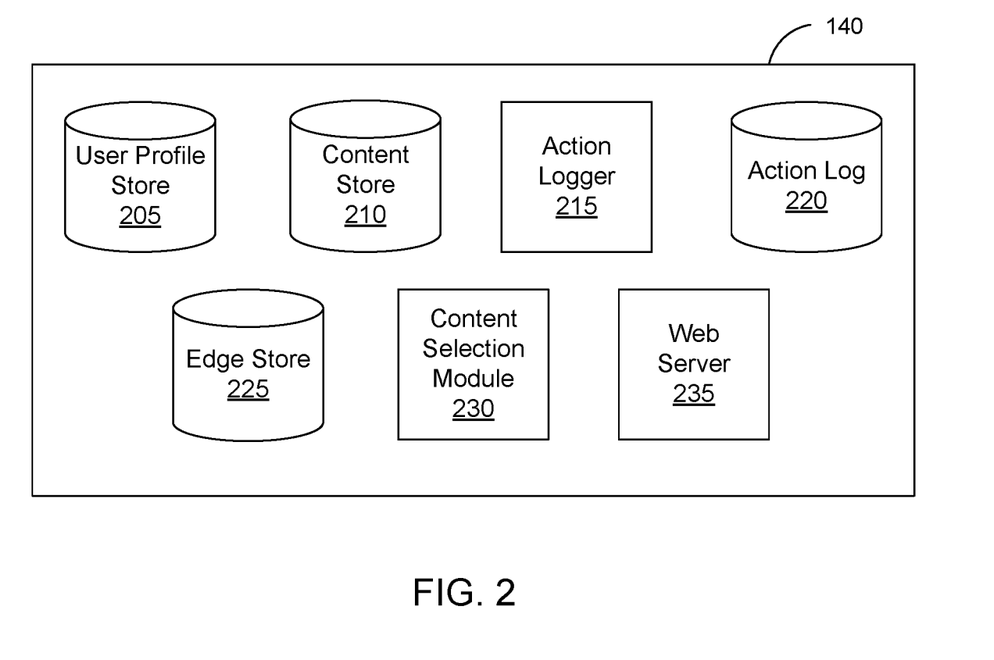
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 generates a notification in response to receiving a request from a user to merge different objects maintained by the content store 210. For example, the content selection module 230 receives a selection from a user to merge a page for a business and another page for a different business from an administrator user of both the page and the other page. When merging different objects, the content selection module 230 identifies users who previously interacted with one or more of the objects being merged from information stored in the action log 220. For example, the content selection module 230 retrieves interactions, or actions, stored in the action log 220 that are associated with an identifier of one or the objects being merge and retrieves identifiers of users associated with the retrieved interactions. The content selection module 230 generates a notification identifying the objects requested to be merged and an indication that the objects have been requested to be merged, as further described below in conjunction with FIGS. 3 and 4. As further described below, the notification includes an identifier of each object to be merged and a description that the identified objects have been requested to be merged. The content selection module 230 transmits the notification to client devices 110 associated with each of the identified users who previously interacted with at least one of the objects being merged.

Additionally, the content selection module 230 generates an interface for presentation to an identified user who previously interacted with at least one of the objects being merged. As further described below in conjunction with FIGS. 4 and 5, the interface includes an entry describing each prior interaction by the identified user with an object being merged and having a corresponding selection option. By selecting a selection option corresponding to a prior interaction by the identified user with an object being merged, the identified user specifies prior interaction for association with an object resulting from merging the different objects. Through selection of different selection options presented by the interface, the identified user specifies different prior interactions with one of the objects being merged to be subsequently associated with the object resulting from the merging. As further described below in conjunction with FIG. 4, the interface provides the identified user with greater control over what prior interactions by the user with one object being merged with another object are subsequently associated with an object resulting from merging the two objects. This affords the individualized user with greater privacy over access to the identified user's prior interactions with different objects after the different objects are merged.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
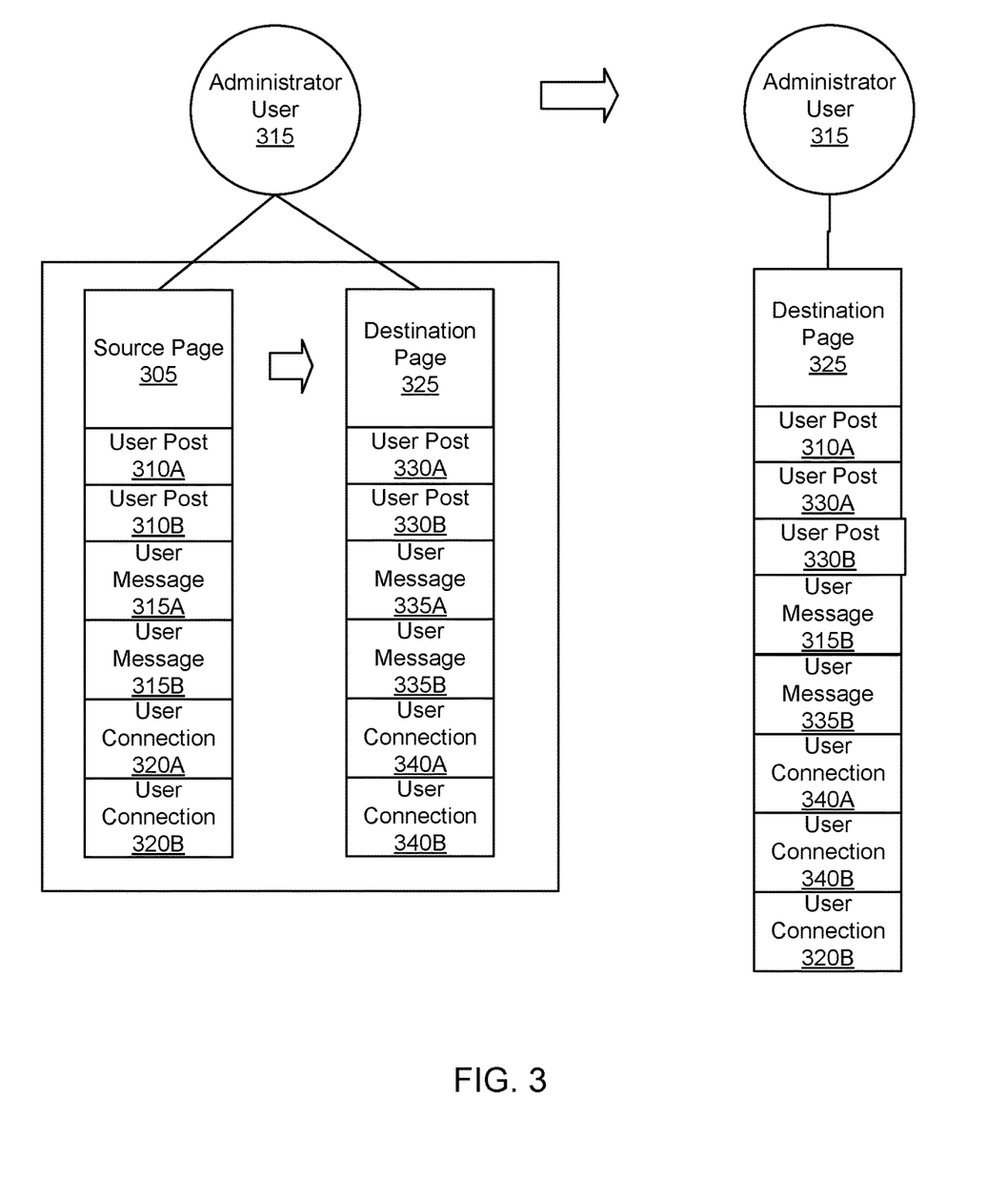
FIG. 3 is process flow diagram of merging a source page maintained by an online system into a destination page maintained by the online system, in accordance with an embodiment.

Merging Objects Maintained by an Online System Subject to User-Selection of Interactions With the Objects to Be Merged FIG. 3 shows a process flow diagram of merging a source page 305 maintained by an online system 140 into a destination page 325 maintained by the online system 140. As shown in FIG. 3, the source page 305 and the destination page 325 are both associated with an administrator user 315. For example, the source page 305 and the destination page 325 each describe different businesses maintained or operated by the administrator user 315. While FIG. 3 describes merging of the source page 305 into the destination page 325, in other embodiments, any suitable objects maintained by the online system 140 may be merged together as further described below.

When merging the source page 305 into the destination page 325, content included in the source page 305 is migrated to the destination page 325, so the destination page 325 includes content previously included in the destination page 325 as well as content previously included in the source page 305. However, users of the online system 140 interact with the source page 305 and with the destination page 325 via the online system 140 over time. For example, users post content to the source page 305 that is subsequently presented to other users via the source page 305 or provide comments to content posted on the source page 305, with the comments subsequently presented via the source page 305. As another example, users interact with the source page 305 through one more message threads with the administrator user 315 via the source page 305, with the online system 140 storing the message threads. Additionally, users establish connections to the source page 305 via the online system 140, which maintains the connections between different users and the source page 305. Similarly, users of the online system post content or comments to the destination page 325 that are stored by the online system 140 and subsequently presented via the destination page, establish connections to the destination page 310 that are stored by the online system 140, generate message threads with the administrator user 315 via the destination page 325 that are maintained by the online system 140, or perform other suitable interactions with the destination page 325 that are maintained by the online system 140. For purposes of illustration, FIG. 3 shows an example where user post 310A, 310B represent content posted to the source page 305 by one or more users, where user message 315A, 315B represent message threads between users and the administrator user 315 via the source page 305, and where user connection 320A, 320B represent connections between different users and the source page 305; similarly, in the example of FIG. 3 user post 330A, 330B represent content posted to the destination page 325 by one or more users, user message 335A, 335B represent message threads between users and the administrator user 315 via the destination page 325, and where user connection 340A, 340B represent connections between different users and the destination page 325.

Upon receiving a request from the administrator user 315 to merge the source page 305 and the destination page 325, the online system 140 identifies interactions with the source page 305 and with the destination page 325, and the corresponding users associated with identified interactions with the source page 305 and interactions with the destination page 325. In various embodiments, the online system 140 retrieves actions associated with the source page 305 stored in the action log 220, further described above in conjunction with FIG. 2, and identifies users associated with each of the stored actions associated with the source page 305. Similarly, the online system 140 similarly retrieves actions associated with the destination page 325 stored in the action log 220 and identifies users associated with each of the stored actions associated with the destination page 325.

To improve user privacy, the online system 140 notifies each user who performed an interaction with the source page 305 or who performed an interaction with the destination page 325 that the source page 305 and the destination mage 325 have been requested to be merged together. For example, the online system 140 transmits a notification message to one or more client devices 110 included in a user profile the online system 140 maintains for a user for whom the online system 140 stores an association with an action that is also associated with the source page 305. The notification message identifies the source page 305 and the destination page 325, and includes a message that the source page 305 and destination page 325 have been requested to merge.

If the online system 140 received requests from the administrator user to merge different combinations of source pages and destination pages, the online system 140 ranks different pairs of source pages and destination pages requested to be merged based on likelihoods of the user selecting interactions with one or more of the source page or of the destination page to be merged for association with the destination page after being merged with the source page. For example, the online system 140 received a request to merge page A and page B, as well as a request to merge page C and page D from one or more administrator users. When generating a notification identifying the received requests to merge pages for a user, the online system 140 determines a likelihood of the user selecting interactions with page A or with page B for association with the resulting page from merging page A and page B and determines a likelihood of the user selecting interactions with page C or with page D for association with the resulting page from merging page C and page D. The notification transmitted to the user identifies the request to merge page A and page B and the request to merge page C and page D in an order based on the determined likelihoods (e.g., requests having higher determined likelihoods are presented in higher positions within the notification).

In one embodiment, the online system 140 determines likelihoods of the user selecting interactions with page A or with page B for association with the resulting page from merging page A and page B and likelihoods of the user selecting interactions with page C or with page D for association with the resulting page from merging page C and page D based on relative distances between geographic locations associated with page A, page B, page C, and page D. For example, if locations associated with one or more of page A and page B are relatively closer to a geographic location the online system 140 maintains in a user profile for the user than geographic locations with page C and page D, the online system 140 determines that the user has a higher likelihood of selecting interactions with page A or with page B to be associated with the results from merging page A and page B; hence, the online system 140 determines that a user is more likely to select interactions with pages to be merged that are associated with locations nearer to a location associated with the user than interactions with pages to be merged that are associated with locations farther than the location associated with the user. In another example, the online system 140 determines likelihoods of the user selecting interactions with one or more of the source page or of the destination page to be merged for association with the destination page after being merged with the source page based on timing or frequency of interactions by the user with the source page or with the destination page. The online system 140 may determine a higher likelihood of the user selecting interactions with one or more of the source page or of the destination page to be merged for association with the destination page after being merged with the source page when the user has more frequently interacted with one or more of the source page or the destination page or when the user has more recently interacted with one or more of the source page or the destination page. Referring to the previous example where a request to merge page A and page B, as well as a request to merge page C and page D from one or more administrator users were received, the online system 140 determines a higher likelihood of selecting interactions with page C or with page D to be associated with the results from merging page C and page D if the user has more frequently interacted (or has more recently interacted) with page C or page D than with page A or page B. In this example, the notification presents the request to merge page C and page D above the request to merge page A with page B. However, in other embodiments, the online system 140 determines likelihoods of the user selecting interactions with one or more of the source page or of the destination page to be merged for association with the destination page after being merged with the source page based on any suitable characteristics of the user, characteristics of the source page, and characteristics of the destination page.

As further described below in conjunction with FIG. 4, in response to receiving a selection of the notification message from a client device 110 associated with a user, the online system 140 generates an interface identifying individual actions that the user has performed with the source page 305 or with the destination page 325. In various embodiments, the interface presents different groups of interactions, with each group including at least one common characteristic. For example, the interface presents different groups of interactions, with each group including a different type of interaction between the user and the source page 305 or with the destination page 325. In a specific example, the interface presents a group including interactions where the user provided content to the source page 305, a group including interactions where the user provided content to the destination page 325, a group including interactions of message threads between the user and the source page 305, a group including interactions of message threads between the user and the destination page 325, a group including interactions that are connections between the user and the source page 305, and a group including interactions that are use connections between the user and the destination page 325. However, in other embodiments, the interface includes any suitable grouping of interactions between the user and the source page 305 or between the user and the destination page 325.

By interacting with the interface, the user selects individual interactions with the source page 305 or interactions with the destination page 325 that the user authorizes to be associated with the destination page 325 after merging with the source page 305. This allows the user to control what prior interactions between the user and the source page 305 or between the user and the destination page 325 are maintained by the online system 140 in association with the destination page 325. Rather than migrate each user interaction with the source page 305 and with the destination page 325 to the destination page 325 when merging the source page 305 and the destination page 325, this provides the user with greater control over how the online system 140 uses stored interactions by the user. Additionally, allowing the user to specify particular interactions with the source page 305 or with the destination page 325 that are associated with the destination page 325 after the merging improves the user's privacy, as additional administrative users may be authorized to view or to access interactions that are associated with destination page 325 after merging the source page 305 and the destination page 325 than were authorized to access the individual source page 305 or the individual destination page 325.

Based on the user's selection of interactions via the interface, the online system 140 subsequently stores associations between the selected interactions and the destination page 325 when combining content from the source page 305 with content from the destination page 325 to merge the source page 305 and the destination page 325. Interactions with the source page 305 by the user that are not selected via the interface, are not stored in association with the destination page 325. Similarly, interactions with the destination page 325 by the user that are not selected via the interface are also not stored in association with the destination page 325. In the example shown by FIG. 3, user post 310A, user post 33A, user post 330B, user message 315B, user message 335B, user connection 340A, user connection 340A, user connection 340B, and user connection 320B were selected by their associated users via interfaces presented to the associated users. Hence, in the example of FIG. 3, the destination page 325 after being merged with the source page 305 is associated with user post 310A, user post 33A, user post 330B, user message 315B, user message 335B, user connection 340A, user connection 340A, user connection 340B, and user connection 320B, while user post 310B, user message 315A, user message 335A, and user connection 320A, which were not selected by their corresponding users via an interface presented to the corresponding users, are not associated with the destination page 325 after being merged with the source page 305.

Figure 4:
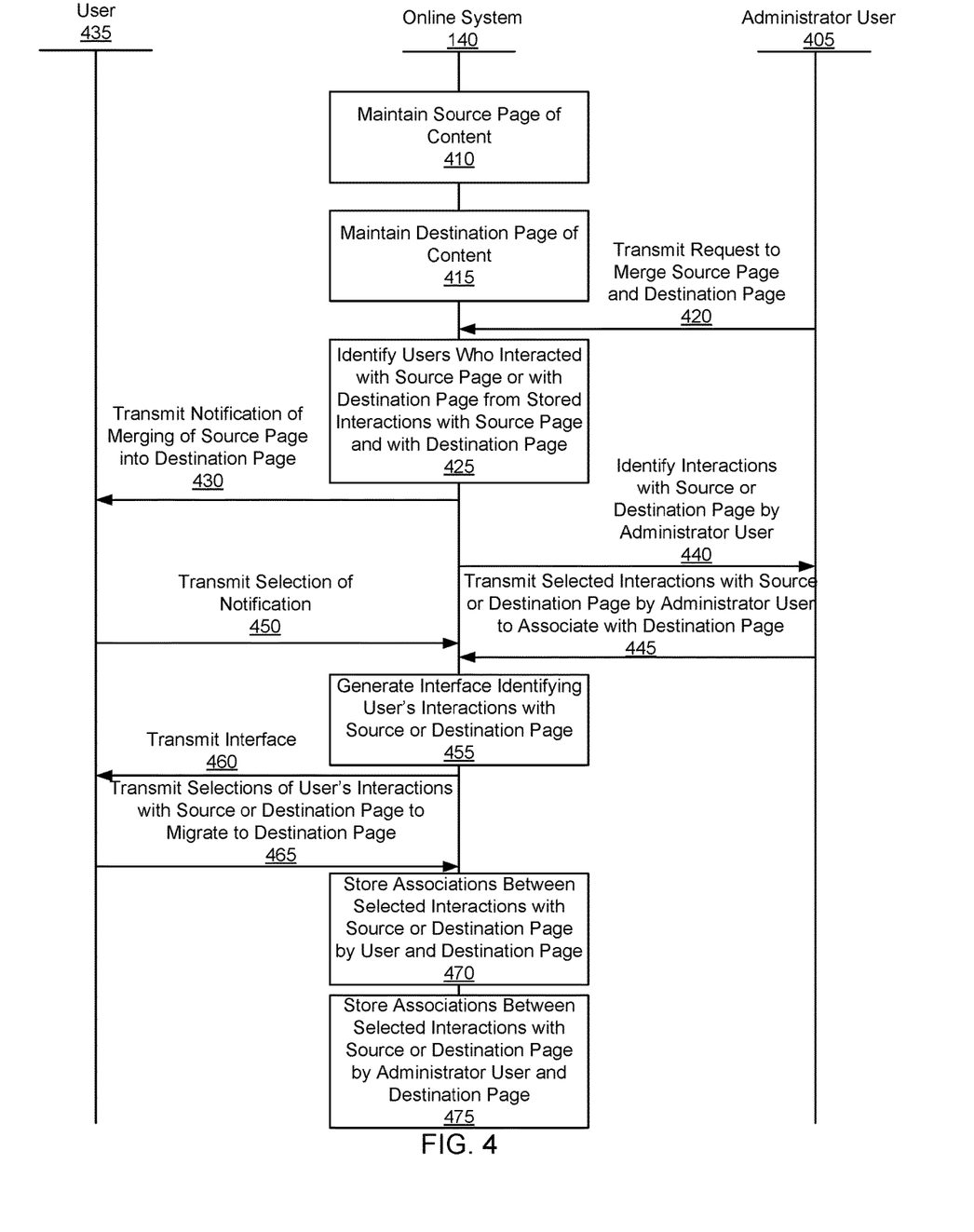
FIG. 4 is an interaction diagram of a method for merging a source page and a destination page maintained by an online system subject to user selection of interactions with the source page or with the destination page to be associated with the result of the merging, in accordance with an embodiment.

FIG. 4 is an interaction diagram of one embodiment of a method for an online system 140 merging a source page and a destination page subject to user selection of interactions with the source page or with the destination page to be associated with the result of merging the source page and the destination page. In various embodiments, the method includes different or additional steps than those described in conjunction with FIG. 4. Additionally, the method may include fewer steps than those described in conjunction with FIG. 4 or perform the steps described in conjunction with FIG. 4 in different orders in some embodiments. For purposes of illustration, FIG. 4 describes merging of different pages maintained by the online system 140; however, the method described in conjunction with FIG. 4 may be used to merge or to combine any suitable objects maintained by the online system 140.

As further described above in conjunction with FIGS. 2 and 3, the online system 140 maintains 410 a source page of content, which is associated with an administrator user 405. One or more users provide content to the online system 140 for presentation to other users via the source page, and the online system 140 stores the provided content in association with the stored page. Additionally, users perform interactions (also referred to as "actions") with the source page via the online system 140, and the online system 140 stores these interactions in association with the source page and with users who performed the interactions. For example, the online system 140 stores information identifying an interaction performed by a user with the source page in association with an identifier of the user who performed the interaction and with an identifier of the source page. Example interactions performed by a user with the source page include: providing a content item for presentation via the source page, providing a comment on a content item presented via the source page, exchanging messages with the administrator user via the source page, establishing a connection with the source page, and providing a reaction for the source page (e.g., indicating a preference for the source page).

Similarly, the online system 140 maintains 415 a destination page that is also associated with the administrator user. Hence, the administrator user is capable of managing content presented by both the source page and the destination page, of exchanging messages through one or more messaging threads established via the source page or the destination page, and of performing any suitable actions to maintain or manage both the source page and the destination page. As with the source page, one or more users provide content to the online system 140 for presentation to other users via the destination page, and the online system 140 stores the provided content in association with the page. Users also perform interactions with the destination page, such as those described above regarding the source page, and the online system 140 stores these interactions in association with the destination page and with users who performed the interactions. For example, the online system 140 stores information identifying an interaction performed by a user with the destination page in association with an identifier of the user who performed the interaction and with an identifier of the destination page.

The administrator user transmits 420 a request to the online system 140 to merge the source page and destination page. The request includes an identifier of the source page and an identifier of the destination page, and an instruction to merge the source page and the destination page. For example, the request includes an instruction to merge the source page into the destination page. The request also includes an identifier of the administrator user and may include an indication that the administrator user has authority to merge the source page and the destination page. In a specific example, the source page and the destination page describe related businesses that the administrator user operates at different physical locations, if the administrator user closes the business operating at one physical location, the administrator user transmits 420 a request to the online system to merge the page for the business at the physical location being closed (i.e., the "source page") with the page for the business at the physical location that is remaining open (i.e., the "destination page").

In response to receiving the request from the administrator user, the online system 140 retrieves interactions with the source page previously performed by various users and interactions with the destination page previously performed by various users from information maintained by the online system 140. For example, the online system 140 retrieves interactions stored in an action log 220, as further described above in conjunction with FIG. 2, that are associated with an identifier of the source page or that are associated with an identifier of the destination page. From stored information identifying interactions by users with the source page and interactions by users with the destination page, the online system 140 identifies 425 users who previously interacted with the source page or with the destination page. For example, the online system 140 retrieves stored interactions associated with an identifier of the source page and identifies 425 users corresponding to user identifiers associated with the actions associated with the identifier of the source page. Similarly, the online system 140 retrieves stored interactions associated with an identifier of the destination page and identifies 425 users corresponding to user identifiers associated with the actions associated with the identifier of the destination page.

For a user 435 identified as having previously interacted with the source page (or with the destination page), the online system 140 transmits 430 a notification that the source page and the destination page are merging. The online system 140 transmits 430 the notification to a client device 110 associated with the user 435 for presentation. For example, the online system 140 retrieves a user profile maintained for the user 435, such as a user profile described above in conjunction with FIG. 2, and transmits 430 the notification that the source page and the destination page have been requested to be merged to a client device 110 identified by the user profile for the user. The notification includes information identifying the source page and identifying the destination page, as well as text or images indicating that the source page and the destination page are merging. For example, the notification includes a name or a title of the source page and a name or a title of the destination page, as well as text stating that the source page is merging with the destination page. As further described above in conjunction with FIG. 3, if the online system 140 has received requests to merge multiple pairs of pages where the user 435 has previously interacted with at least one page in a pair specified by a received request, the online system 140 may present the different pairs of pages that are requested to be merged in an order that is based on likelihoods of the user 435 selecting one or more prior interactions with a page to subsequently be associated with a page resulting from merging the page with another page; for example, requests to merge pairs of pages including a page with which the user 435 is more likely to select one or more prior interactions to associate with a page resulting from merging pages included in the requests are more prominently presented by the notification.

When the user 435 selects the notification via a client device 110 presenting the notification, the client device 110 transmits 450 a selection of the notification to the online system 140. In some embodiments, the online system 140 generates 455 an interface identifying the user's prior interactions with the source page or with the destination page in response to receiving the selection of the notification. Alternatively, the online system 140 generates 455 the interface after identifying 425 that the user 435 previously interacted with the source page or with the destination page and stores the generated interface in association with the user 435. To generate 455 the interface, the online system 140 retrieves stored interactions that are associated with the identifier of the source page and that are associated with the identifier of the user 435. The online system 140 also retrieves stored interactions that are associated with the identifier of the destination page and that are associated with the identifier of the user 435.

In various embodiments, the online system 140 groups previously performed interactions by the user 435 with the source page (or with the destination page) by type of interaction. Hence, each group of previously performed interactions includes previously performed interactions having a common type. Example types of interactions include providing content for presentation by the source page (or by the destination page), establishing a connection with the source page (or with the destination page), and creating a message thread with the administrator user via the source page (or via the destination page). In the preceding example, the online system 140 generates 455 the interface so three distinct groups of previously performed interactions by the user with the source page (or with the destination page), where a group includes interactions where the user provided content for presentation via the source page (or with the destination page), an additional group includes interactions where the user established a connection with the source page (or with the destination page), and another group where the user created a message thread with the administrator user via the source page (or via the destination page). The generated interface visually differentiates between different groups in various embodiments. For example, the generated interface includes different display regions, with each display presenting a different group of previously performed interactions with the source page (or with the destination page), allowing the user to more easily identify different previously performed interactions with the source page (or with the destination page).

Figure 5:
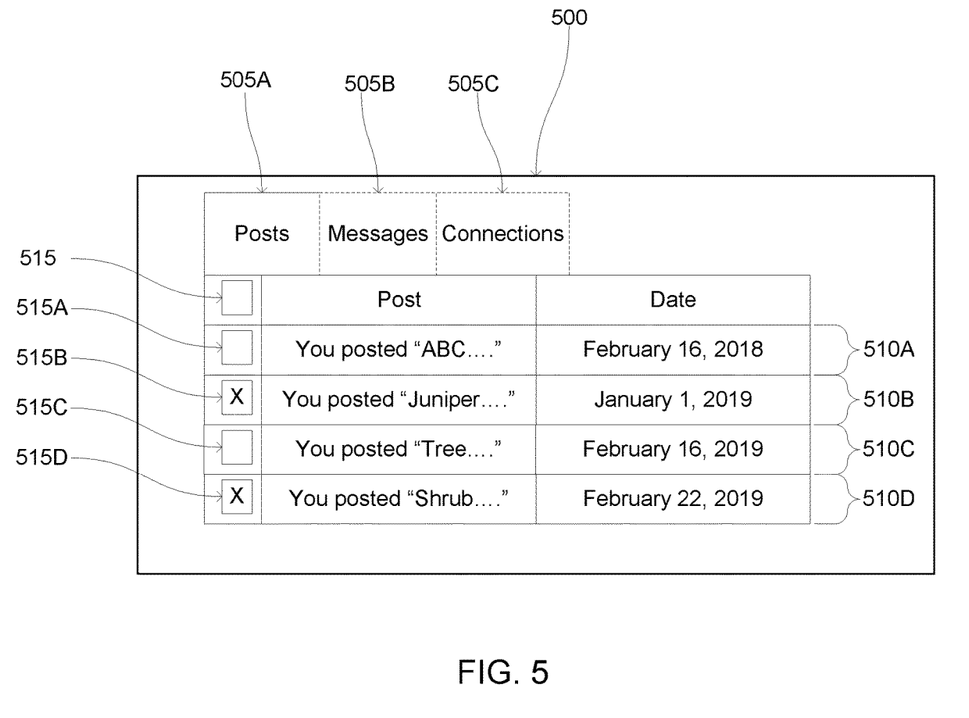
FIG. 5 an example interface identifying prior interactions by a user with or more pages of content maintained by an online system, in accordance with an embodiment.

FIG. 5 shows an example interface 500 identifying prior interactions by a user with or more pages of content maintained by an online system 140. For example, the interface 500 shows previously performed interactions by a user with a source page being merged with a destination page; similarly, the interface 500 may show previously performed interactions by the user with the destination page. For purposes of illustration, the interface 500 shown in FIG. 5 shows interactions previously performed by the user with one of the source page or the destination page, while in other embodiments, the interface 500 shows interactions previously performed by the user with the source page and interactions previously performed by the user with the destination page.

In the example of FIG. 5, the interface 500 displays different types of performed interactions in different display regions, so different display regions display previously performed interactions having different types. FIG. 5 shows the interface 500 including three display regions 505A, 505B, 505C. Display region 505A displays prior interactions with a page of content where the user provided content (e.g., content items) for presentation to other users via the page. Display region 505B displays prior interactions where the user established message threads with an administrator user of the page via the page. Display region 505C displays prior interactions where the user established a connection with the page (e.g., indicated a preference for the page). In FIG. 5, display region 505A is shown for purposes of illustration, while display region 505B and display region 505C are hidden until being selected by the user.

The example of display region 505A shown in FIG. 5 displays entries 510A, 510B, 510C, 510D for each prior interaction by the user providing content (e.g., a content item) for presentation to other users via the page. As shown in FIG. 5, each entry 510A, 510B, 510C, 510D includes information describing an individual interaction with the page where the user provided a content item to the online system 140 for presentation via the page. In the example of FIG. 5, each entry 510A, 510B, 510C, 510D includes a date when the user performed the interaction, and information identifying content provided to the online system 140 by the user via the interaction. While FIG. 5 includes a portion of content provided to the online system 140 via an interaction in an entry 510A, 510B, 510C, 510D corresponding to the interaction, in other embodiments, the interface 500 presents any suitable information identifying content provided to the online system 140 via an interaction. Corresponding entries for interactions in the other display regions 505B, 505C also include information capable of uniquely identifying each interaction (e.g., a date when the interaction was performed and a description of the interaction).

The interface 500 also displays a selection option 515 in conjunction with each entry 510A, 510B, 510C, 510D identifying an individual interaction performed by the user. As shown in FIG. 5, selection option 515A corresponds to entry 510A, selection option 515B corresponds to entry 510B, selection option 515C corresponds to entry 515C, and selection option 515D corresponds to entry 515D. To select a previous interaction with a page for association with a resulting page from merging the page with another page, the user selects a selection option 515A, 515B, 515C, 515D corresponding to an entry 510A, 510B, 510C, 510C representing the previous interaction. In the example of FIG. 5, selection option 515B and selection option 515D have been selected by the user to identify interactions described by entry 515B and entry 515D, respectively, for association with the resulting page from merging the page with another page. Additionally, the interface 500 shown in FIG. 5 also includes selection option 515 that, when selected by a user, selects each interaction shown in display region 505A for association with the resulting page from merging the page with another page; hence, selection option 515 allows the user to easily select all interactions included in a display region 505 for association with the resulting page from merging the page with another page.

Referring back to FIG. 4, the online system 140 transmits 460 the interface to a client device 110 for presentation to the user 435 in response to receiving a selection of the notification. For example, the online system 140 transmits 460 the interface to the client device 110 from which the selection of the notification was received. Through the interface, the user 435 selects one or more previously performed interactions with the source page (or with the destination page) to be associated with the destination page after being merged with the source page. For example, referring to the example interface described above in conjunction with FIG. 5, the interface displays a selection option with each previously performed interaction with the source page (or with the destination page), and the user 435 selects a selection option displayed with a previously performed interaction to select the previously performed interaction for association with the destination page after being merged with the source page. In the preceding example, previously performed interactions for which the selection options displayed with the previously performed interactions are not selected via the interface are not subsequently associated with the destination page after being merged with the destination page. Hence, the interface allows the user 435 to select individual interactions with the source page or with the destination page that are subsequently associated with the destination page after being merged with the source page. This provides the user 435 with greater control over interactions that the user 435 previously performed with the source page or with the destination page that the online system 140 associates with the destination page after being merged with the source page. Allowing the user 435 to individually select interactions associated with the merged source and destination page provides the user with 435 with greater privacy regarding prior interactions with the source page or with the destination page by allowing the user 435 to identify specific prior interactions by the user that are accessible by users who subsequently access the destination page after being merged with the source page.

One or more prior interactions with the source page or with the destination page selected by the user 435 via the interface are included in a selection that is transmitted 465 from the client device 110 presenting the interface to the online system 140. The selection includes information identifying the user 435 and identifying the one or more previous interactions by the user 435 with the source page or with the destination page selected by the user 435 via the interface. For example, the selection includes unique identifiers associated with each previous interaction by the user 435 with the source page or with the destination page that the user 435 selected via the interface.

Subsequently, the online system 140 stores 470 associations between the destination page and each of the selected interactions by the user 435 with the source page or with the destination page identified by the received selection. Additionally, the online system 140 deletes associations between interactions by the user 435 with the source page that are not identified by the received selection and similarly deletes associations by the user 435 with the destination page that are not identified by the received selection. In various embodiments, the online system 140 also deletes interactions by the user 435 with the source page that are not identified by the received selection and deletes interactions by the user 435 with the destination page that are not identified by the received selection. Hence, identifying individual interactions with the source page or with the destination page via the interface allows the user 425 to control which prior interactions the online system 140 subsequently associates with the destination page after being merged with the source page, providing the user with increased control over subsequent access to the user's prior interactions after merging the source page and the destination page.

The online system 140 similarly allows the administrator user 405 to identify individual interactions with the source page or with the destination page for association with the destination page after merging the source page with the destination page. The online system 140 identifies 445 interactions by the administrator user 405 with the source page or with the destination page from stored actions associated with the source page and with the destination page, as further described above regarding identification of interactions by the user 435 with the source page or with the destination page. For example, the online system 140 identifies 445 actions stored in the action log 220 that are associated with an identifier of the administrator user 405 and that are associated with an identifier of the source page or an identifier of the destination page and transmits the identified interactions to a client device associated with the administrator user 405. In various embodiments, the online system 140 transmits an additional interface, which is generated as further described above and in conjunction with FIG. 5 to the client device associated with the administrator user 405 to identify 445 prior interactions by the administrator 405 with the source page or with the destination page.

The administrator user 405 transmits 445 an administrator selection of interactions by the administrator user 405 with the source page or with the destination page. In various embodiments, the selection includes information identifying the administrator user 405 and identifying the one or more previous interactions by the administrator user 405 with the source page or with the destination page selected by the administrator user 405 via the additional interface. For example, the administrator selection includes unique identifiers associated with each previous interaction by the user 435 with the source page or with the destination page that the user 435 selected via the additional interface, as further described above in conjunction with FIGS. 4 and 5.

Subsequently, the online system 140 stores 475 associations between the destination page and each of the selected interactions by the administrator user 405 with the source page or with the destination page. Additionally, the online system 140 deletes associations between interactions by the administrator user 405 with the source page that are not identified by the administrator selection received from the administrator user 405 and similarly deletes associations between interactions by the administrator user 405 with the destination page that are not identified by the received administrator selection. Hence, the online system 140 also allows the administrator user 405 to selectively identify individual prior interactions with the source page or with the destination page that are stored in association with the destination page after being merged with the source page, increasing control of the administrator user 405 over subsequent access to the administrator user's prior interactions after merging the source page and the destination page.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining a source page of content and a destination page of content at an online system, the source page of content and the destination page of content both associated with an administrator user and associated with previously received interactions by users of the online system;
receiving, at the online system, a request from the administrator user to merge the source page into the destination page;
identifying one or more users of the online system who previously interacted with the source page from stored interactions associated with users maintained by the online system;
transmitting a notification of the requested merging of the source page into the destination page to a client device associated with an identified user;
selecting previous interactions with the source page by the identified user maintained by the online system;
generating an interface identifying a previous interaction with the source page by the identified user maintained by the online system;
transmitting the generated interface to the client device associated with the identified user, in response to receiving a selection of the notification;

receiving a selection including one or more previous interactions with the source page by the identified user via the generated interface from the client device; and storing, at the online system, associations between the destination page and each of the one or more previous interactions with the source page by the identified user included in the received selection.

2. The method of claim 1, wherein generating the interface identifying the previous interaction with the source page by the identified user maintained by the online system comprises:

selecting previous interactions with the destination page by the identified user maintained by the online system;

including one or more previous interactions with the destination page by the identified user with the source page and including one or more previous interactions by the identified user with the destination page in the interface.

3. The method of claim 2, wherein the selection includes one or more previous interactions with the destination page, and further comprising:

storing, at the online system, associations between each previous interaction by the user with the destination page included in the selection; and removing associations between one or more previous interactions with the destination page by the user maintained by the online system and not included in the selection.

4. The method of claim 1, further comprising:

removing associations between one or more previous interactions with the source page by the user maintained by the online system and not included in the selection.

5. The method of claim 1, further comprising:

selecting previous interactions with the destination page or with the source page by the administrator maintained by the online system;

generating an additional interface identifying one or more previous interactions with the source page by the administrator user and one or more previous interactions with the destination page by the administrator user;

transmitting the generated interface to a client device associated with the administrator user;

receiving an administrator selection including one or more interactions selected from the one or more previous interactions with the source page by the administrator user or from the one or more previous interactions with the destination page by the administrator user from the client device associated with the administrator user; and storing, at the online system, associations between the destination page and each of the one or more interactions included in the administrator selection.

6. The method of claim 5, further comprising:

removing associations between one or more previous interactions with the destination page by the administrator user maintained by the online system and not included in the administrator selection; and removing associations between one or more previous interactions with the source page by the administrator user maintained by the online system and not included in the administrator selection.

7. The method of claim 1, wherein transmitting the notification of the requested merging of the source page into the destination page to the client device associated with the identified user comprises:

identifying an additional request received by the online system to merge an additional source page into an additional destination page;

retrieving a physical location of the identified user maintained by the online system;

retrieving physical locations associated with each of the source page, the destination page, the additional source page, and the additional destination page;

ranking the request and the additional request based on relative distances between the physical location of the identified user and the physical locations associated with the source page and the destination page of the request and between the physical location of the identified user and locations associated with the additional source page and the additional destination page of the additional request; and including the request and the additional request in the notification in an order specified by the ranking.

8. The method of claim 1, wherein transmitting the notification of the requested merging of the source page into the destination page to the client device associated with the identified user comprises:

identifying an additional request received by the online system to merge an additional source page into an additional destination page;

retrieving a physical location of the identified user maintained by the online system;

determining frequencies with which the identified user previously interacted with each of the source page, the destination page, the additional source page, and the additional destination page;

ranking the request and the additional request based on frequencies with which the identified user previously interacted with the source page and the destination page of the request and previously interacted with the additional source page and the additional destination page of the additional request, so a request which with which the user more frequently interacted has a higher position in the ranking; and including the request and the additional request in the notification in an order specified by the ranking.

9. The method of claim 1, wherein transmitting the notification of the requested merging of the source page into the destination page to the client device associated with the identified user comprises:

identifying an additional request received by the online system to merge an additional source page into an additional destination page;

retrieving a physical location of the identified user maintained by the online system;

determining a most recent interaction by the identified user with each of the source page, the destination page, the additional source page, and the additional destination page;

ranking the request and the additional request based the most recent interactions by the identified user with of the source page and the destination page of the request and the most recent interactions by the identified user with the additional source page and the additional destination page of the additional request, so a request including a page with which the most recent interaction by the user is nearest to a current time has a higher position in the ranking; and including the request and the additional request in the notification in an order specified by the ranking.

10. The method of claim 1, wherein each previous interaction with the source page has a type, the type selected from a group consisting of: posting a content item for presentation by the source page, establishing a message thread via the source page, and establishing a connection to the source page.

11. The method of claim 10, wherein the interface includes a different display region corresponding to each type, a display region including entries for each previous interaction with the source page by the identified user having a type corresponding to the display region and not including entries for previous interactions with the source page having other types.

12. The method of claim 1, wherein the interface includes an entry for each previous interaction with the source page by the identified user and a selection option corresponding to each entry.

13. A computer program product comprising a non-transitory computer readable storage medium having instructions encoded thereon that, when executed by a processor cause the processor to:
 maintain a source page of content and a destination page of content at an online system, the source page of content and the destination page of content both associated with an administrator user and associated with previously received interactions by users of the online system;
 receive, at the online system, a request from the administrator user to merge the source page into the destination page;
 identify one or more users of the online system who previously interacted with the source page from stored interactions associated with users maintained by the online system;
 transmit a notification of the requested merging of the source page into the destination page to a client device associated with an identified user;
 select previous interactions with the source page by the identified user maintained by the online system;
 generate an interface identifying a previous interaction with the source page by the identified user maintained by the online system;
 transmit the generated interface to the client device associated with the identified user in response to receiving a selection of the notification;
 receive a selection including one or more previous interactions with the source page by the identified user via the generated interface from the client device; and
 store, at the online system, associations between the destination page and each of the one or more previous interactions with the source page by the identified user included in the received selection.

14. The computer program product of claim 13, wherein generate the interface identifying the previous interaction with the source page by the identified user maintained by the online system comprises:
 selecting previous interactions with the destination page by the identified user maintained by the online system;
 including one or more previous interactions with the destination page by the identified user with the source page and including one or more previous interactions by the identified user with the destination page in the interface.

15. The computer program product of claim 14, wherein the selection includes one or more previous interactions with the destination page, and further comprising:
 storing, at the online system, associations between each previous interaction by the user with the destination page included in the selection; and
 removing associations between one or more previous interactions with the destination page by the user maintained by the online system and not included in the selection.

16. The computer program product of claim 13, wherein the non-transitory computer readable storage medium further has instructions encoded thereon that, when executed by the processor, cause the processor to:
 remove associations between one or more previous interactions with the source page by the user maintained by the online system and not included in the selection.

17. The computer program product of claim 13, wherein transmit the notification of the requested merging of the source page into the destination page to the client device associated with the identified user comprises:
 identify an additional request received by the online system to merge an additional source page into an additional destination page;
 retrieve a physical location of the identified user maintained by the online system;
 retrieve physical locations associated with each of the source page, the destination page, the additional source page, and the additional destination page;
 rank the request and the additional request based on relative distances between the physical location of the identified user and the physical locations associated with the source page and the destination page of the request and between the physical location of the identified user and locations associated with the additional source page and the additional destination page of the additional request; and
 include the request and the additional request in the notification in an order specified by the ranking.

18. The computer program product of claim 13, wherein transmit the notification of the requested merging of the source page into the destination page to the client device associated with the identified user comprises:
 identify an additional request received by the online system to merge an additional source page into an additional destination page;
 retrieve a physical location of the identified user maintained by the online system;
 determine frequencies with which the identified user previously interacted with each of the source page, the destination page, the additional source page, and the additional destination page;
 rank the request and the additional request based on frequencies with which the identified user previously interacted with the source page and the destination page of the request and previously interacted with the additional source page and the additional destination page of the additional request, so a request which with which the user more frequently interacted has a higher position in the ranking; and
 include the request and the additional request in the notification in an order specified by the ranking.

19. The computer program product of claim 13, wherein transmit the notification of the requested merging of the source page into the destination page to the client device associated with the identified user comprises:
 identify an additional request received by the online system to merge an additional source page into an additional destination page;
 retrieve a physical location of the identified user maintained by the online system;

determine a most recent interaction by the identified user with each of the source page, the destination page, the additional source page, and the additional destination page;

rank the request and the additional request based the most recent interactions by the identified user with of the source page and the destination page of the request and the most recent interactions by the identified user with the additional source page and the additional destination page of the additional request, so a request including a page with which the most recent interaction by the user is nearest to a current time has a higher position in the ranking; and include the request and the additional request in the notification in an order specified by the ranking.

20. The computer program product of claim 13, wherein each previous interaction with the source page has a type, the type selected from a group consisting of: posting a content item for presentation by the source page, establishing a message thread via the source page, and establishing a connection to the source page.

21. The computer program product of claim 13, wherein the interface includes a different display region corresponding to each type, a display region including entries for each previous interaction with the source page by the identified user having a type corresponding to the display region and not including entries for previous interactions with the source page having other types.

* * * * *